(12) United States Patent
Ben-Aissa

(10) Patent No.: US 6,764,013 B2
(45) Date of Patent: Jul. 20, 2004

(54) MULTI-PURPOSE TERMINAL, PAYROLL AND WORK MANAGEMENT SYSTEM AND RELATED METHODS

(75) Inventor: Nebil Ben-Aissa, Palatine, IL (US)

(73) Assignee: American EPS, Inc., Chicago, IL (US)

( * ) Notice: Subject to any disclaimer, the term of this patent is extended or adjusted under 35 U.S.C. 154(b) by 0 days.

(21) Appl. No.: 10/183,767

(22) Filed: Jun. 27, 2002

(65) Prior Publication Data
US 2003/0197055 A1 Oct. 23, 2003

Related U.S. Application Data

(60) Provisional application No. 60/372,983, filed on Apr. 17, 2002.

(51) Int. Cl.[7] .................................................. G06K 7/10

(52) U.S. Cl. .................................. 235/472.01; 235/385

(58) Field of Search ............................. 235/472.01, 375, 235/382, 385, 462.45, 379; 705/22, 30, 32

(56) References Cited

U.S. PATENT DOCUMENTS

| | | |
|---|---|---|
| 4,170,015 A | 10/1979 | Elliano et al. |
| 4,218,627 A | 8/1980 | Wexler et al. |
| 4,270,043 A | 5/1981 | Baxter et al. |
| 4,323,771 A | 4/1982 | Chalker, Jr. et al. |
| 4,376,887 A | 3/1983 | Greenaway et al. |
| 4,401,994 A | 8/1983 | Witts et al. |
| 4,466,078 A | 8/1984 | Treiman |
| 4,542,286 A | 9/1985 | Golarz |
| 4,658,357 A | 4/1987 | Carroll et al. |
| 4,819,162 A | 4/1989 | Webb, Jr. et al. |
| 5,129,652 A | 7/1992 | Wilkinson |
| 5,276,314 A * | 1/1994 | Martino et al. ............. 235/380 |
| 5,336,870 A | 8/1994 | Hughes et al. |
| 5,453,601 A | 9/1995 | Rosen |
| 5,459,657 A | 10/1995 | Wynn et al. |
| 5,477,038 A | 12/1995 | Levine et al. |
| 5,550,359 A | 8/1996 | Bennett |
| 5,600,554 A * | 2/1997 | Williams .................... 395/201 |
| 5,717,867 A | 2/1998 | Wynn et al. |
| 5,754,655 A | 5/1998 | Hughes et al. |
| 5,842,128 A | 11/1998 | Bonner et al. |
| 5,991,742 A | 11/1999 | Tran |
| 6,012,048 A | 1/2000 | Gustin et al. |
| RE37,122 E | 4/2001 | Levine et al. |
| 6,298,335 B1 | 10/2001 | Bernstein |

(List continued on next page.)

OTHER PUBLICATIONS

U.S. Pub 2001/0047316, Halliman, 09/8827,283, A method for the interconnectivity of independent software applications.*

Primary Examiner—Daniel St. Cyr
(74) Attorney, Agent, or Firm—Cook, Alex, McFarron, Manzo, Cummings & Mehler, Ltd.

(57) ABSTRACT

Employees gain access to a payroll and work management system by authentication at a multi-purpose terminal with a bankcard encoded with a unique account number and a personal identification number (PIN). The terminal may then be used to check-in and checkout of work, to receive new work instructions or assignments, to review payroll details, to print a payroll stub, to execute financial transactions, to print a receipt of financial transactions or to review or to upload the results of work quality audits. The invention also includes systems and methods that utilize such multi-purpose terminals to calculate the payroll and deductions for each employee and to issue electronic fund transfers from the employer's bank account to deposit the net pay in a bank account associated with each employee's bankcard so that the pay is immediately accessible by each employee, such as by withdrawal of cash at an ATM or by purchases at a point of sale. Electronic payrolls may be processed and employee's accounts credited with pay on a daily basis, or on any preset period of time, including hourly.

43 Claims, 8 Drawing Sheets

U.S. PATENT DOCUMENTS

| | | |
|---|---|---|
| 6,347,306 B1 * | 2/2002 | Swart .......................... 705/32 |
| 6,366,929 B1 | 4/2002 | Dartigues et al. |
| 6,408,337 B1 | 6/2002 | Dietz et al. |
| 6,473,500 B1 * | 10/2002 | Risafi et al. ................ 235/379 |
| 2001/0011684 A1 | 8/2001 | Krause |
| 2001/0032119 A1 | 10/2001 | Bode |
| 2001/0042032 A1 | 11/2001 | Crawshaw et al. |
| 2001/0044756 A1 | 11/2001 | Watkins et al. |
| 2001/0049619 A1 | 12/2001 | Powell et al. |
| 2002/0029272 A1 | 3/2002 | Welle |

* cited by examiner r

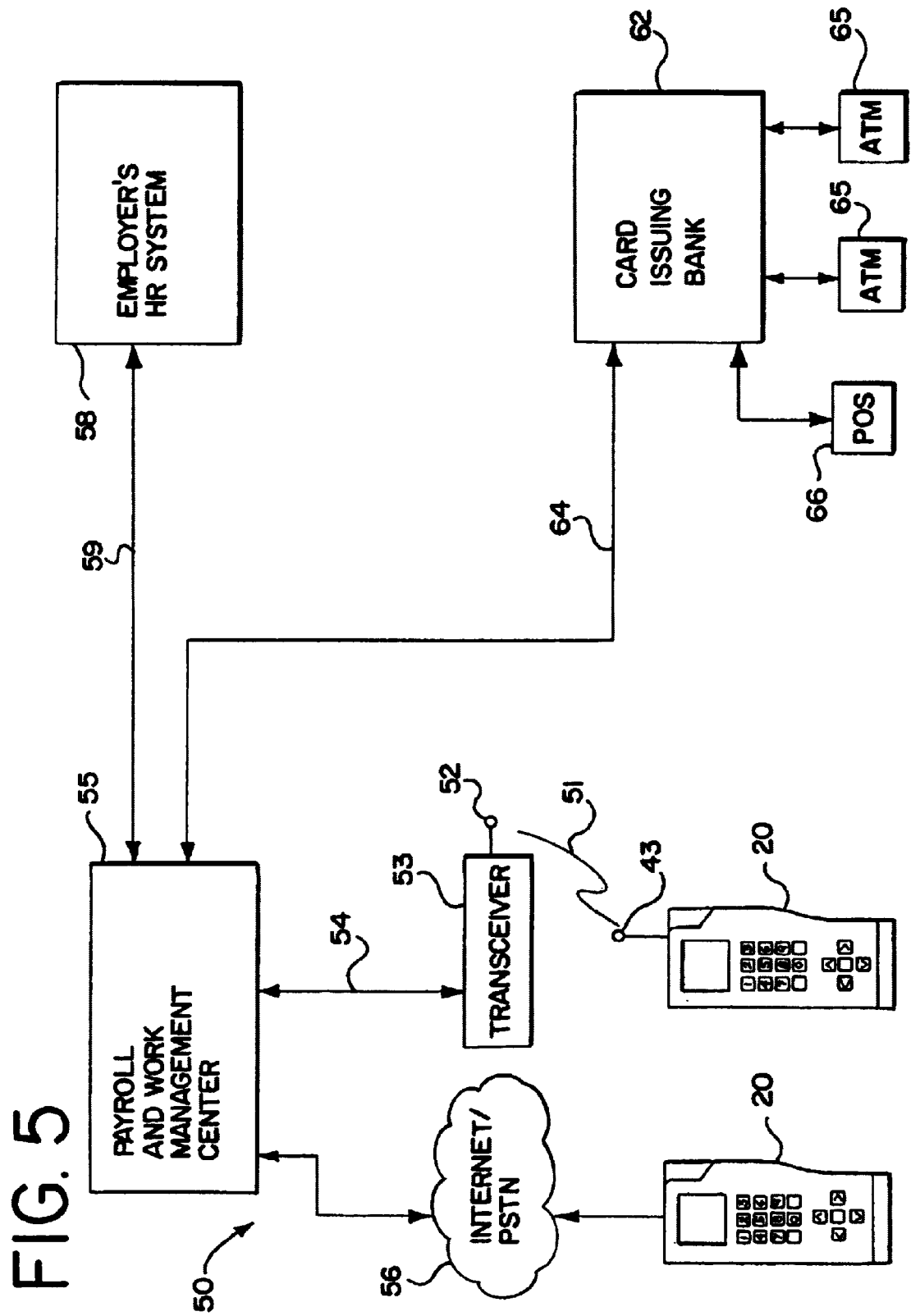

MULTI-PURPOSE TERMINAL, PAYROLL AND WORK MANAGEMENT SYSTEM AND RELATED METHODS

CROSS-REFERENCE TO RELATED APPLICATION

This patent application is a non-provisional application of U.S. provisional patent application Serial No. 60/372,983, filed on Apr. 17, 2002.

BACKGROUND OF THE INVENTION

This invention relates in general to a multi-purpose terminal, payroll and work management system and related methods, and more particularly, to a multi-purpose terminal that employees may use after authentication with a bank card and personal identification number (PIN) to check-in and check-out of work, to receive new work instructions or assignments, to review payroll details, to print a payroll stub, to execute financial transactions, to print a receipt of a financial transaction or to receive the results of work quality audits. The invention also relates to systems and methods that utilize such multi-purpose terminals, including deposit of net pay in a bank account associated with each employee's bankcard so that the pay is immediately accessible by each employee.

Automated teller machines (ATMs) are typically owned by banks or banking networks. They are widely available and are frequently used to dispense cash. A customer inserts or slides a bankcard in the ATM so that a coded account number can be read from the bankcard. Through a financial network, such as Visa™/Plus™ or Mastercard™/Cirrus™, the ATM then communicates with the bank that issued the bank card (the issuing bank) to see if the desired cash withdrawal exceeds the current balance in a bank account that is related to the account number. If not, the cash is dispensed and the card owner's account is debited in the amount of the withdrawal plus any service charge for use of the ATM.

The user of the bankcard is also provided with a personal identification number (PIN) or password that is associated with the account number. The PIN is entered at the request of the ATM prior to authenticating both the account number and the PIN. In the event that the bankcard is lost, the finder will not be able to withdraw funds since he/she lacks the PIN necessary to complete any ATM transaction.

ATMs provide a variety of account transactions. The user may withdraw cash from user's checking account, savings account or as an advance from a line of credit, such as a credit card account. The user may also transfer funds between accounts, such as from a checking account to a savings account. In some instances, the user may ascertain the balances in accounts associated with the account number. However, the principal use of ATMs continues to be cash withdrawal.

Local currency exchanges compete with banks and the ATMs by providing financial services for their profiled customers. Profiled customers have previously signed a signature card or have otherwise previously confirmed their identity with a local currency exchange, or with a network of such currency exchanges. Currency exchanges tend to operate locally, instead of in nationwide like the banking networks. The currency exchanges compete with banks and ATMs by cashing checks, particularly payroll checks, for its profiled customers. A typical fee for such a transaction is about 1.6 percent of the amount of the payroll check. For higher volume transactions, the income from check cashing can be quite substantial.

The customers of currency exchanges are typically lower-wage local residents who do not have checking or savings accounts at a local bank, and therefore rely on a currency exchange to convert their paychecks into cash. Since they do not have a bank account, they do not have a bankcard and cannot use an ATM. There is therefore a business opportunity for banks to acquire new customers by providing the functions performed by currency exchanges in cashing payroll checks and money orders.

Wire transfer of funds is another function typically performed by one bank to another bank. This function is not normally available at currency exchanges. As a result, those individuals who use currency exchanges for their financial affairs often use a company that specializes in wire transfers, such as Western Union or American Express Company. The fees for providing wire transfer service at these companies are generally around 4 to 6.5 percent, depending upon the amount transferred. For example, a typical current fee for wire transferring a minimum of $200.00 is about $13.00. These fees are graduated upwardly for larger wire transfers; such as to about $200.00 in fees to wire transfer $5,000.00.

Many of the afore-mentioned lower-wage earners send money to their relatives in the United States or abroad. Among the other more significant users of wire transfers are travelers and the parents of college students because immediate access to funds is often desired or needed. Thus, if wire transfers could be accomplished relatively inexpensively, additional customers could be obtained who are likely to also use the other available financial services. This presents yet another business opportunity.

Larger employers usually develop or purchase a payroll system. Often, the payroll system is part of a larger computer system that records many different types of business transactions. These payroll systems are quite complex since they must deal not only with time and attendance, but also with a plethora of potential deductions. Deductions generally include federal income tax, FICA, state income tax, in some instances county, township or city tax, health insurance, dental insurance, contributions to retirement plans, contributions to profitability or stock purchase plans, union dues, alimony and the like. For businesses with employees in more than one state, the complexity is usually compounded by differences in the state and local tax laws.

However, the real inefficiency in payroll systems is in keeping track of the time of hourly employees. Customarily, timesheets are collected, the payroll is processed and payroll checks are cut and distributed to the employees. Payroll is often centralized for employers with more than one location. This means that timesheets are express mailed to where the payroll is processed, such as at the corporate headquarters. The payroll checks must then be issued and express mailed back to all of the employee locations. This process is expensive, cumbersome and time consuming. Thus, payroll cannot practically or economically be done on a daily basis is such systems. Most employers therefore pay their employees once every two weeks, or once a month.

Employee turnover is another significant expense. The payroll database must frequently be updated to add new employees and to delete former employees, including all pertinent employee information. The hiring process to attract and bring in new employees to replace departing employees is particularly expensive.

On the other hand, employers can increase employee loyalty and reduce such payroll and hiring expenses by paying wages more frequently, such as on a weekly basis, or even on a daily basis. Research indicates that lower-wage employees will frequently change jobs for as little as $0.25 per hour increase in wages. This is particularly a problem for employers in labor-intensive industries, such as janitorial services, fast food franchises and the like.

Research also indicates that many employees will actually work for somewhat less compensation than is available in the competitive marketplace if they are paid more frequently. This is because many employees operate from paycheck to paycheck, and some employees have difficulty surviving financially until the next paycheck. A more frequent paycheck is therefore of considerable value to such employees since it reduces the pay cycle. More frequent wage payment also operates as a disincentive for many employees to change employment to a different employer with longer wage payment intervals.

Another problem with prior art payroll systems is fraud resulting from buddy punching. This is where an employee who may be late, leaves early, or will be absent on a particular day has a buddy or friend punch his/her timecard in and/or out. Such fraud remains a significant problem in many labor-intensive industries where large numbers of employees check-in and checkout each workday. Various biometric systems that verify the identity of the person by his or her physical characteristics, such as the retina of the eye or a fingerprint, have been proposed and implemented. However, such biometric systems remain expensive, and some employees are opposed to placing one of their eyes close to a piece of equipment. Furthermore, due to differences in height of different employees and the number of employees checking in or out at any particular time, more than one such biometric system will often be required at each employment location. Lower-wage employees are generally less educated about technology, including biometric devices. Such employees may be paranoid or otherwise uncomfortable about checking in and checking out through biometric devices. The forced use of biometric devices therefore results in many employees voluntarily terminating their employment. Thus, there exists a need to effectively and economically minimize the buddy-punching problem without the expense and intimidation associated with biometric devices.

Many lower-wage employees, such as those that clean commercial buildings and/or private property, perform their work after normal business hours. Thus, if an owner or manager of the property wants to change the work to be performed, he/she has to stay late, leave written instructions, or call the manager of the cleaning services. Even if the employee receives the work changes, the employee may not be able to perform the work because of union rules, the scope of the work services contract or the like. In addition, the desired work change may involve a different type of work that is compensated at a different pay rate. The property manager may have to contact the supervisor of the employee to renegotiate the contract, and then try to contact and inform the employee. These cumbersome and time consuming approaches could be avoided if the employee's supervisor and/or the property manager had a better way to communicate the new work instructions or assignment to the employee, such as by the employee receiving the instructions or assignment upon checking in to work.

Quality inspectors routinely do inspection of the work performed at the property site. These audits are typically reported by paper or electronically, as by computer or hand-held device. Thus, the inspector usually sends the quality report to a remote location by faxing a paper report or by using a modem to link to a database. The process of sending the report could be made more efficient if the inspector could use the same electronic terminal to send the quality report that the employee uses to check into or out of work.

Even if the employees are paid electronically by deposit to a known bank account number, laws in most jurisdictions require that the employer provide a copy of the payroll stub to the employee that lists the gross pay, the deductions and the net pay. Supervisors, payroll administrators and human relations personnel frequently receive inquiries about the payroll stub, particularly where different job assignments have different pay rates. The ability to print out a detailed payroll stub, such as at the same electronic terminal that the employee uses to check into or out of work, including the different pay rates for the different types of work could highly effective in reducing these time-consuming inquiries.

SUMMARY OF THE INVENTION

The present invention includes a multi-purpose terminal, a payroll and work management system and related methods. The terminal and system provide ATM, payroll and work management (APW) functions. Such functions include recording employee attendance and work hours, providing work instructions and assignments to the employees, periodically calculating the payroll and depositing payroll funds into each employee's account for immediate access by the employees, permitting each employee to review his/her payroll including gross pay, deductions and net pay, printing an employee's payroll stub, enabling employees to review and execute financial transactions and receiving and displaying the results of work quality audits. Access to the system is permitted after authenticating a bankcard and personal identification number (PIN). Each bankcard is related to a separate bank account and the employer deposits each employee's net pay in the respective accounts. The employee can then use the bankcard to withdraw cash from any supported ATM station or to pay for transactions at any point of sale (POS) device.

Each employee is provided with a bankcard encoded with a unique identifying account number and a personal identification number (PIN). The bankcard may be either the magnetic stripe type or the smartcard type. One or more APW terminals are located at the employer's work site to read the account number and to request entry of the user's PIN. Together, the bankcard and PIN are used as work attendance devices in place of a conventional time card and/or timesheet. The account number and PIN are communicated from the APW terminal to a computer, which may be an array of servers. The servers have the employee names, pay rates, the unique identifying account number for each employee and the PIN for each employee stored in memory. The servers then compare the received account number and PIN with account numbers and PINs previously stored in memory to authenticate the account number and to use the current time as a payroll check-in or checkout time for that employee.

The APW system periodically uses the check-in and checkout times to calculate the payroll, to authorize the transfer of funds sufficient to cover the total amount of the payroll to the bank that issued the bankcards, and directs the bank to credit the bankcards for each employee in the amount of the calculated pay for each employee. The employees may then withdraw the deposited funds from an ATM, use the bank card to pay for purchases or to transfer available funds to another account. The employee may also view his/her payroll information, and print out a payroll stub.

Authorized users may enter work assignments or instructions into the APW system, such as through a dedicated call center or by secured access to the system. Upon authentication of the employee at the APW terminal, the employee is presented with a greeting. If the employee's work is subject to change, the terminal may display a set of new work assignments or instructions. To the extent that the rate of pay differs for different assignments, a breakdown of the pay for each work assignment may also be displayed. Appropriate incentives may be provided such as increased pay for certain assignments or for overtime work to motivate the employee to accept the assignments. The employee may obtain a print out of the work assignments from the terminal.

A general object of the present invention is to provide a system that offers hourly workers a turnkey financial, payroll and work management solution that is economically beneficial for them as well as for their employers.

Another object of the present invention to provide an electronic payroll system and methods therefor wherein an electronic terminal reads an encoded unique employee account number from a bank card and requests entry of a PIN, both of which are then communicated to a computer for authentication.

Another object or the present invention is to minimize the payroll fraud resulting from buddy punching through the use of bankcards and PINs as authentication devices.

Another object of the present invention is to use the bankcard and PIN as work attendance devices by using the times of authentication as work check-in and work checkout times.

A further object of the present invention is to eliminate the inefficiencies in issuing and distributing payroll checks, to employees by, periodically crediting net pay to a bank account associated with the bank card that is also used to check-in and check-out of work and by enabling the employees to print their paycheck stub at the electronic terminal, or at any supported ATM terminal.

Yet another object of the invention is to enable printing of work assignments at the electronic terminal.

Another object of the invention is to provide a convenient means of uploading work quality audits into the system from the electronic terminal.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures in which like reference numerals identify like elements, and in which:

FIG. 5 is another simplified block diagram, similar to FIG. 4, illustrating another embodiment in which the employer's bank is also the card-issuing bank.

DETAILED DESCRIPTION OF THE INVENTION

Figure 1:
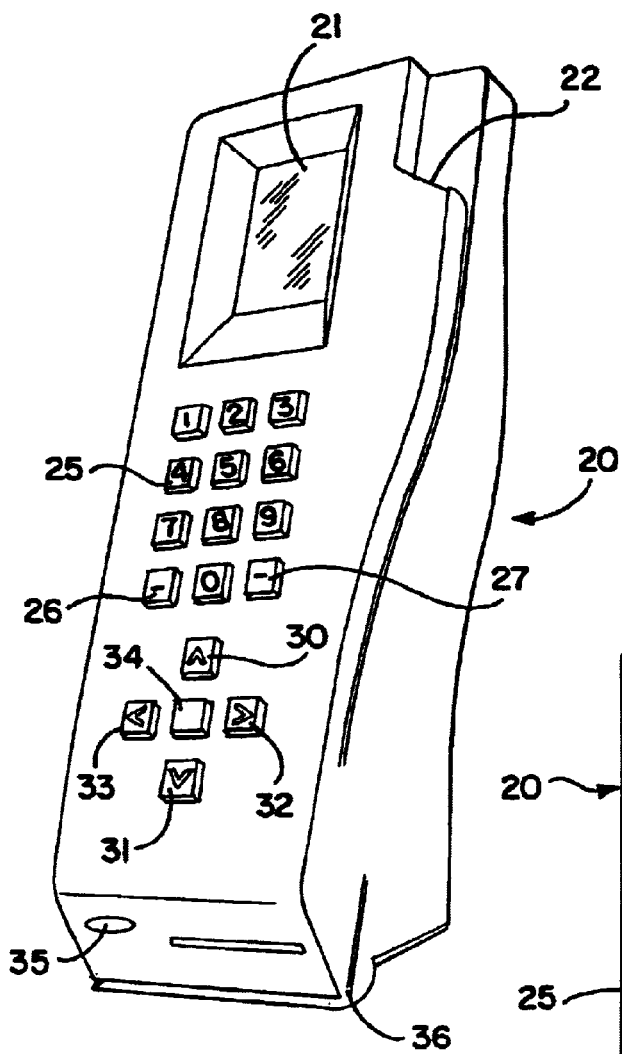
FIG. 1 is a perspective view of an electronic terminal suited for reading a unique identifying account number on a bankcard assigned to an employee and for entering a PIN in accordance with the present invention.
Figure 2:
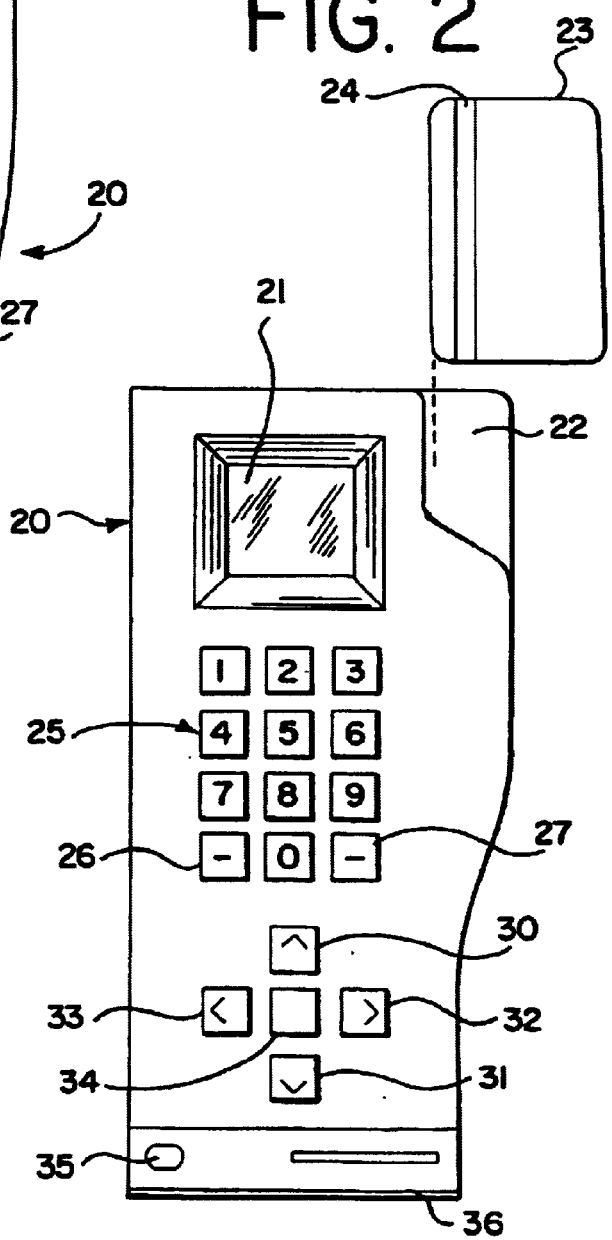
FIG. 2 is a top plan view of the electronic terminal illustrated in FIG. 1, also illustrating a bankcard with a magnetic stripe.

Referring to the Figures, and particularly to FIGS. 1 and 2, an electronic terminal, generally designated 20, is constructed in accordance with the invention. Preferably, electronic terminal 20 has ATM, payroll and work management (APW) capability, and will hereinafter be referred to as an APW terminal 20. Disposed near an upper end of APW terminal 20 is a display screen 21 for displaying information, options, commands, work assignments, or the like. The APW terminals may be located wherever employees usually check-in or check-out of work, such as at the employer's facilities, or at the customer's facilities in those instances where the employees work at the customer's facilities, for example, janitorial or cleaning staff.

APW terminal 20 is provided with a slot 22 for sliding a card 23 therethrough to read data that is encoded on a magnetic stripe 24 of the card 23. For example, card 23 may be a bankcard issued by a bank and the magnetic stripe may have a unique identifying number encoded thereon which corresponds to one or more accounts at said bank. Of course, APW terminal 20 could alternatively be equipped to read information from smartcards. Since bankcard 23 is also used in the APW terminal as an ATM, payroll and work management (APW) card, card 23 will hereinafter be referred to as an APW card.

A plurality of keys is disposed near the middle of APW terminal 20 for entry of information, commands or the like. An array of twelve keys 25 includes ten keys that are numbered 1 through 0 for entry of numeric information. A key 26 may be used as for a clear function and a key 27 may be used for a enter function.

Another array of keys 30–34 is disposed near a lower end of the APW terminal 20. Keys 30–33 are used to navigate through the information or options shown on display screen 21. A key 30 may be used to scroll up and a key 31 may be used to scroll down through the various options displayed on screen 21. A key 33 may be used to scroll left or to access a prior page on screen 21, while a key 32 may be used to scroll right or to access the next page. A centrally located key 34 in the array may be used to enter or initiate a function that has been selected by operation of keys 30–32.

An infrared communications port 35 may be provided, as along the bottom edge of APW terminal 20 in the embodiment shown in FIGS. 1 and 2, to communicate with other devices that also utilize infrared communication means. For example, a supervisor of employees or a customer of employment services may enter information about new work assignments, or may provide information about previous work assignments that were not completed or that were unsatisfactorily completed. The supervisor or customer may also enter the new work assignments or the feedback on prior work assignments on a portable or laptop personal computer (PC) or a personal digital assistant (PDA) that is also equipped with an infrared communications port. Such information may then be received by the APW terminal and communicated to a computer for processing, storage and/or later retrieval.

A printer slot 36 is disposed in a bottom edge of APW terminal 20 through which an internal printer 47 (FIG. 3) can provide a printed copy of the information displayed on the screen 21. For example, an authenticated employee may use the navigation key array 30–34 to obtain a print-out of a payroll stub relating to the most recent pay period including details about gross pay, deductions and net pay. Other types of printed information from APW terminal 20 may include current work assignments and/or locations, recent activity and balances in bank accounts related to the unique number of the APW card, and the like. The results of work quality audits may also be made available for printing.

Figure 3:
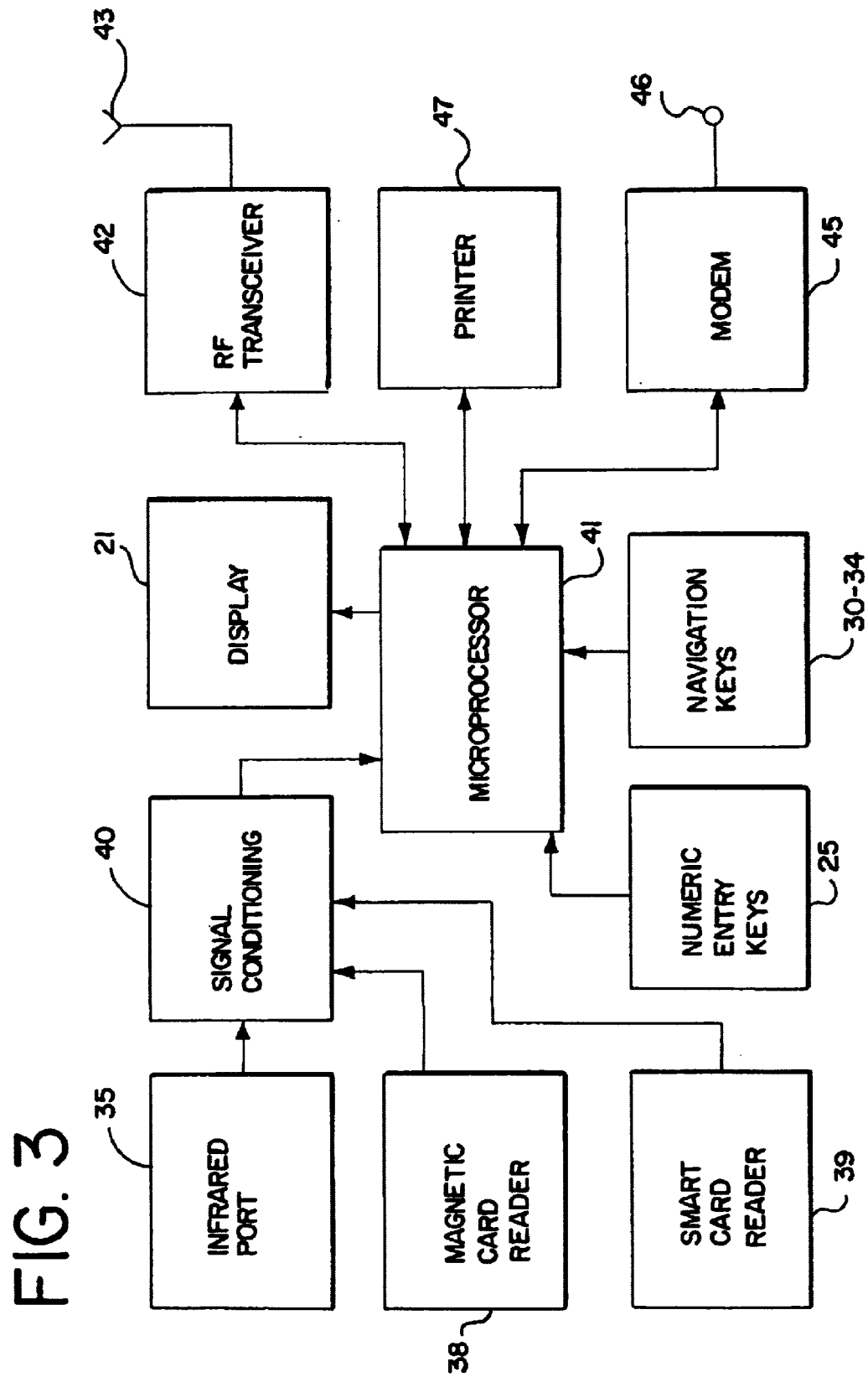
FIG. 3 is a block diagram of the internal structure and functionality of the electronic terminal illustrated in FIGS. 1 and 2.

The internal structure and functionality of APW terminal 20 is illustrated in FIG. 3. As previously described, APW terminal 20 has a magnetic card reader 38 disposed in the card slot 22 to read encoded information from the magnetic stripe 24 disposed on the APW card 23. Terminal 20 may also be provided with a smartcard reader 39 to read information from a smartcard. As also previously described, terminal 20 has an infrared port 35 to communicate with other devices having infrared ports, such as PCs and PDAs. Information signals from the magnetic card reader 38, the smartcard reader 39 and the infrared port 35 are preferably conditioned by signal conditioning circuitry 40 to provide input signals that are compatible with input terminals of a microprocessor 41. Microprocessor 41 also receives inputs from the numeric entry keys 25, including the clear key 26 and the enter key 27. Similarly, the navigation keys 30–34 provide input signals to microprocessor 41.

Any of the information provided to APW terminal 20 may be communicated to a computer or database, which may be remotely located. To this end, microprocessor 41 may supply input information to a radio frequency (RF) transceiver 42 for transmission via an antenna 43. The path of RF transmission may be by conventional antenna-to-antenna RF transmission, a microwave link, a satellite link, or the like. Terminal 20 also receives information from a remotely located computer or database via RF transmission in the reverse direction, such as from antenna 43 to RF transceiver 42 to microprocessor 41. Typically, microprocessor 41 will provide some of the received information for display on the display screen 21.

The microprocessor 41 in terminal 20 preferably has sufficient dedicated memory, either internally or externally, to store the unique account numbers of the bank cards and the PINs of the employees that frequently use any particular terminal 20. Authentication of those employees may then be done internally at terminal 20 without having to communicate with a remote computer to access the appropriate account numbers and PINs. However, in such instances, terminal 20 continues to communicate with a remote computer or database to provide the check-in and checkout times for processing the payroll.

Terminal 20 may also communicate, separately or in tandem with the RF link, via a modem 45. Modem 45 has an output terminal or jack 46 to communicate bidirectionally with a remotely located computer or database either by means of the public switched telephone network (PSTN) or by means of the internet.

An internal printer 47 may be activated by the navigation keys 30–34 to print information on display screen 21. The printed copy is provided through printer slot 36. Printer 41 may be of the thermal paper type.

Figure 4:
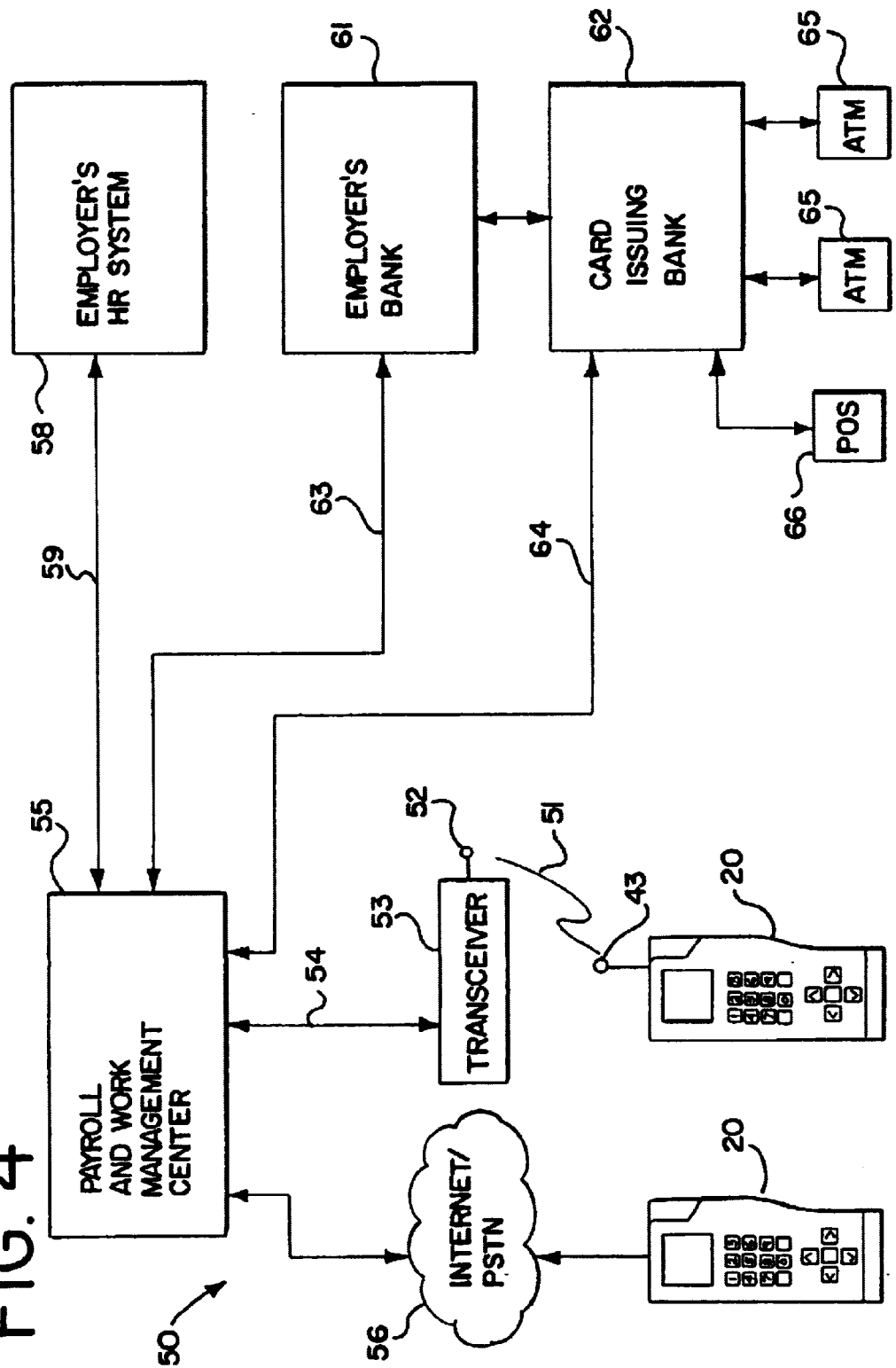
FIG. 4 is a simplified block diagram illustrating one embodiment of the present invention in which payroll funds are credited from an account in the employer's bank to the employee's bankcard account for access at an ATM or a point of sale.

With reference to FIG. 4, there is shown an ATM, payroll and work management (APW) system in accordance with the invention, generally designated 50. One or more APW terminals 20 are included in the APW system 50. One of the terminals 20 is shown with an antenna 43 to transmit radio waves to the antenna 52 of a transceiver 53, which in turn communicates with a payroll and work management center 55 via one or more lines 54. While antennas 43 and 52 of terminal 20 and transceiver 53, respectively, are shown as external for purposes of the illustration in FIG. 5, it will be appreciated that these antennas 43 and 52 could be internally disposed within the respective terminals. The other terminal 20 is shown communicating with center 55 via the internet or the PSTN 56.

The payroll and work management center 55 has a computer with memory for storing the names of employees, the pay rate for each employee, any deductions from pay for health insurance or the like, the number of the unique bank card that has been assigned to each employee and the PIN associated with each bank card. Payroll and work management center 55 may have additional pertinent information concerning each employee, such as a mailing address and a home telephone number. Center 55 previously received such information from the employer's human relations (HR) system 58 via a communication line 59. From time to time as new employees are hired, or when the status of an employee changes, employer's HR system 58 provides updated employee information to the payroll and work management center 55.

Center 55 also records the time of check-in and the time of checkout for each employee to determine the amount of work time. The pay for each employee is calculated based upon the recorded work time and the pay rate for each employee. These calculations may occur as frequently as directed by the employer, such as each day or each week. Payroll and work management center 55 then advises the employer of the amount of the payroll. Center 55 then performs an electronic funds transfer (EFT) from employer's bank in the amount of the payroll so that each employee's bank account associated with each APW card will be credited in the net amount of pay for that pay period.

Payroll and work management center 55 may advise employer's HR system on line 59, employer's bank 61 on line 63 and/or the card issuing bank 62 on line 64 of the break-down of the payroll. Each employee with earnings in the respective pay period will have his/her account associated with the bankcard credited with the appropriate amount of net pay. Thereafter, the employee may access his/her available funds, such as by making cash withdrawals at an ATM 65. The APW card may also be used as a debit card against available funds at any point of sale (POS) 66, such as at department stores, grocery stores, gas stations or the like.

FIG. 5 illustrates a payroll and work management system, generally designated 60, similar to the system 50 illustrated in FIG. 4. However, in the system 60, there is no intermediate bank, such as employer's bank 61 in FIG. 5. Otherwise, the operation of the system 60 is generally similar to the already described operation of system 50.

Figure 6A:
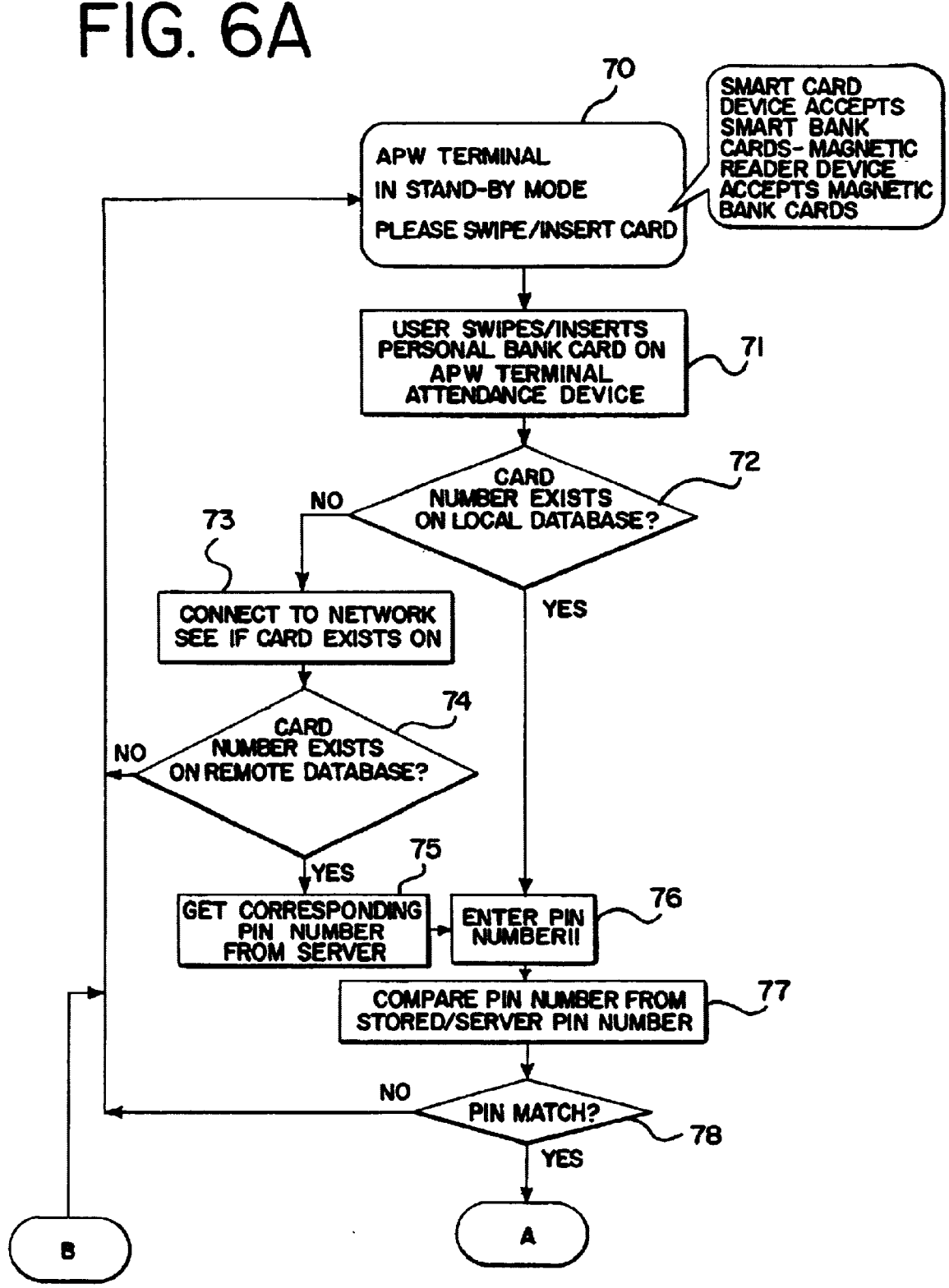
FIG. 6A is the first portion of a flowchart illustrating the steps employed by the electronic terminal and a computer to authenticate a bankcard number and PIN including the various options available after authentication, such as checking-in or checking-out of work on the electronic terminal illustrated in FIGS. 1–5.
Figure 6B:
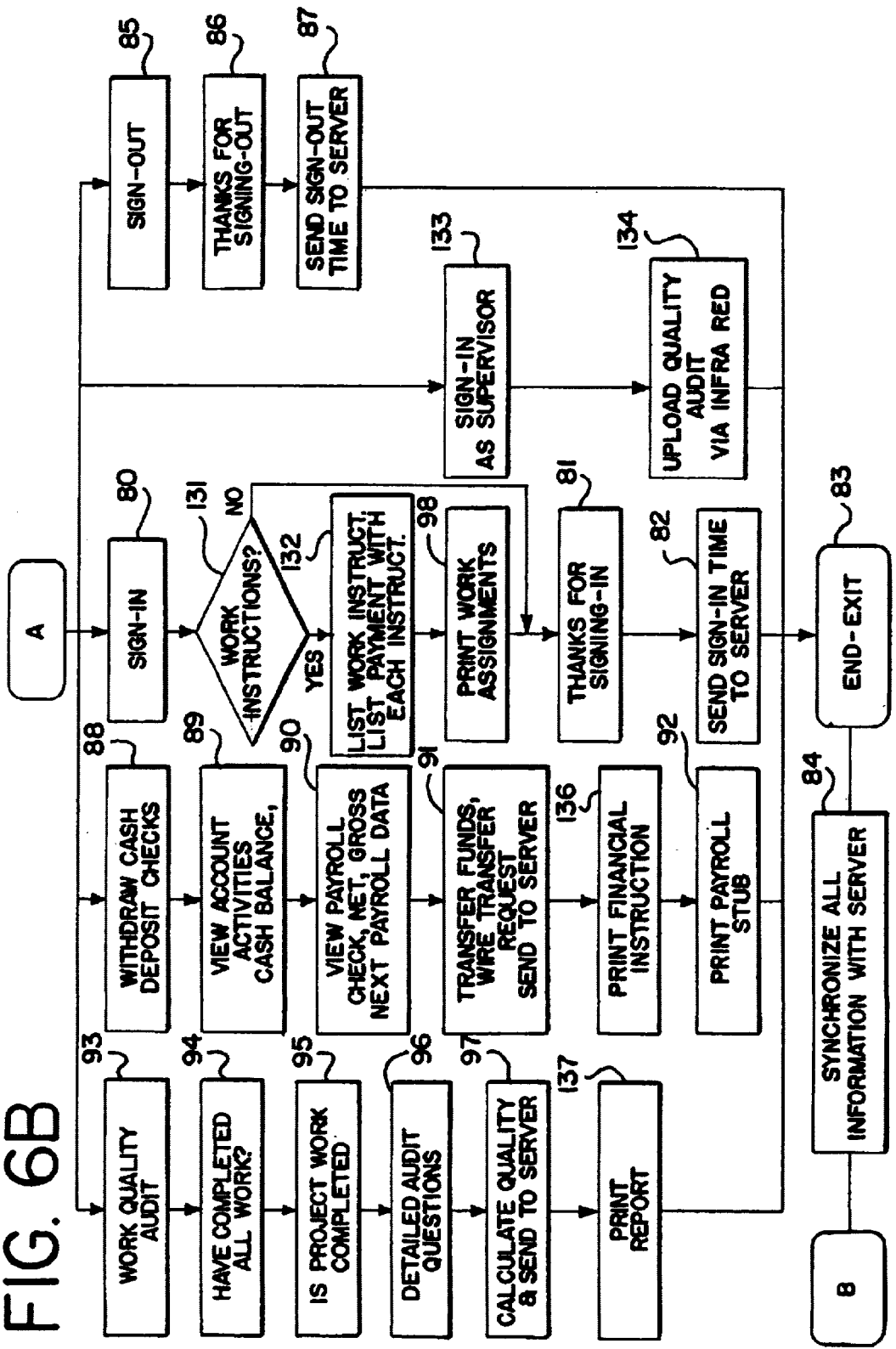
FIG. 6B is the second and remaining portion of the flowchart illustrated in FIG. 6A.

FIGS. 6A and 6B are flowcharts of the functions and communications between one or more APW terminals 20 and the payroll and work management center 55. As seen in block 70, the APW terminal 20 is initially in a stand-by mode and display 21 may display a request, such as "Please Swipe or Insert Card". When the user swipes or inserts his/her card, the unique account number is read and transmitted to the payroll and work management center 55, as indicated in block 71. Center 55 then searches to see if the card number exists on its local database as shown in decision block 72. If not, center 55 may poll a remote network or database, such as that existing at the employer (block 73). If the card number exists on a remote database, block 74, the center 55 will also obtain the corresponding PIN from the remote database, block 75. If the card number and PIN are not available on remote databases, the APW terminal 20 will return to the stand-by mode in block 70.

Assuming that the card number and PIN are available on the local or remote databases, APW terminal 20 requests that the employee enter the PIN at block 76. The entered PIN is then compared to the stored PIN information in block 77. If there is no match, decision block 78 returns the APW terminal 20 to the stand-by mode; block 70. If there is a PIN match at block 78, the authentication procedure is successfully completed and the employee continues to the various options shown in FIG. 6B.

Upon completing authentication of the card number and PIN, the employee may be presented with four options on the display screen 21, such as sign-in, sign-out, financial transactions and work related functions. The employee then uses the navigation keys 30–34 to scroll to one of the desired functions displayed on screen 21. If sign-in is selected, terminal 20 acknowledges that the employee has signed in at block 80 in FIG. 6B. Note that the employee has already used his/her card to gain access to terminal 22, so there is no need to again have the bankcard read by terminal 20, or to reenter the PIN. Block 131 determines if any work assignments or instructions were previously entered for this employee. If so, the work assignments and/or instructions are presented on the display 21 of terminal 20 as indicated at block 132. Since there may be differences in pay for different types of work, the different pay rates are also displayed. The employee may then print out the assignments, instructions and pay rates from the terminal 20. The time of sign-in is then sent to the computer at the payroll center, as indicated in block 82. Alternatively, the computer may simply receive the sign-in information and set the time of sign-in by using its own clock. The APW terminal 20 then exits via block 83, synchronizes its data with that of the computer as shown in block 84 and returns to the stand-by block 70.

If the employee elects to sign-out of work after authentication of the bank card number and PIN, as at block 85, the terminal 20 thanks the employee for signing out, as at block 86. The computer then stores the time of sign-out. The computer can then determine the amount of time worked by determining the amount of time between the times of signing in and signing out.

If the employee selects a financial transaction after the authentication procedure, several choices such as shown in blocks 88–92 in FIG. 6B may appear. If APW terminal 20 is equipped for cash transactions, the employee may withdraw cash or deposit money into the bank account associated with the account number encoded on the APW card, as at block 88. If the choice illustrated in block 89 is selected, the employee may see the current balance in the bank account and may review recent account activities, such as within the last month. The employee may also view the last payroll payment credited into his/her account, the gross pay, the deductions from gross pay, the next payroll date, and so forth, as shown in block 90. The employee may also print this information by selecting the print payroll stub option at block 92. The employee may select to transfer funds to another account, such as a checking account, or to request a wire transfer as shown in block 91.

The employee may also select work related functions after authentication of the bankcard and PIN. Blocks 93–97 are reserved for a supervisor or customer to enter information about the performance of the employee that may affect the amount of pay. The employee may view this information, but not make new entries or change the existing information. However, if the employee frequently receives new work assignments, he/she may view the new work assignments or the new work location, as shown in block 98. The new assignments may also be printed out at APW terminal 20, as shown at block 98.

A supervisor or customer may also sign in at terminal 20 as indicated at block 133. A work quality audit may then be uploaded at the infrared port 35 of terminal 20 as previously described, and as indicated at block 134. This is the report that the employee may view at blocks 93–96. The quality audit may result in adjustments to the employee's pay in accordance with prior arrangements or understandings between the employer and employee.

Figure 7:
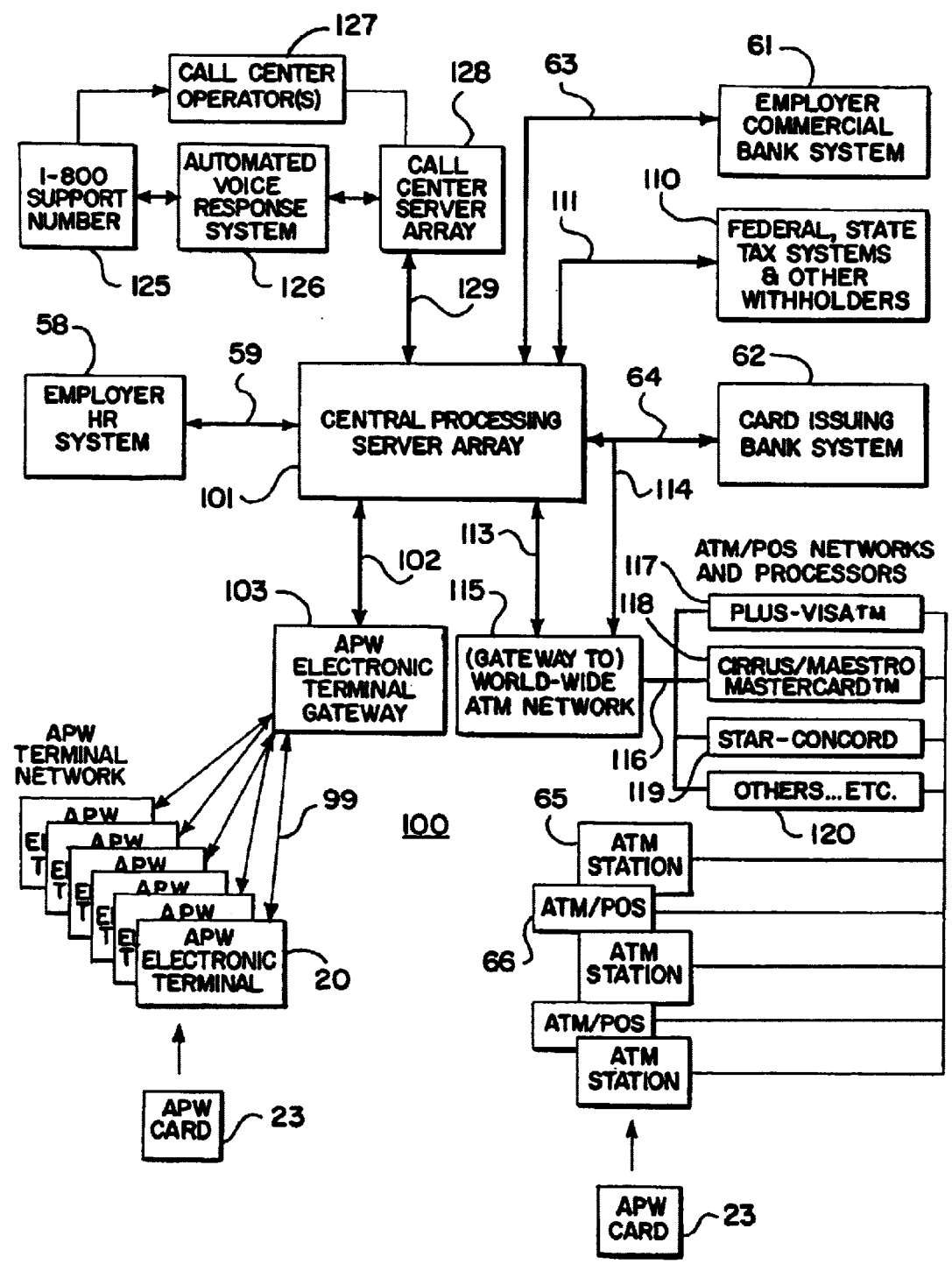
FIG. 7 is block diagram illustrating the entire ATM, payroll and work management system in greater detail than FIGS. 4 and 5.

Illustrated in FIG. 7 is a payroll and work management system, generally designated 100. Payroll and work management center 100 is the preferred embodiment of this invention. A plurality of APW terminals 20 communicate via links 99, which may be via an internet or PSTN link 56 or a wireless link 51 (FIGS. 4 and 5) to an APW electronic terminal gateway 103. Gateway 103 is equipped with modems and transceivers to receive the communications from the APW terminals 20. Gateway 103 may also be equipped with a conventional firewall to protect a central processing server array 101 from unauthorized access. Information to and from APW terminals 20 is communicated between the array 101 the gateway 103 via lines 102. Gateway 103 may be physically located near array 101 or gateway 103 may be located at an employer's site where it communicates with a plurality of APW terminals 20.

Figure 8:
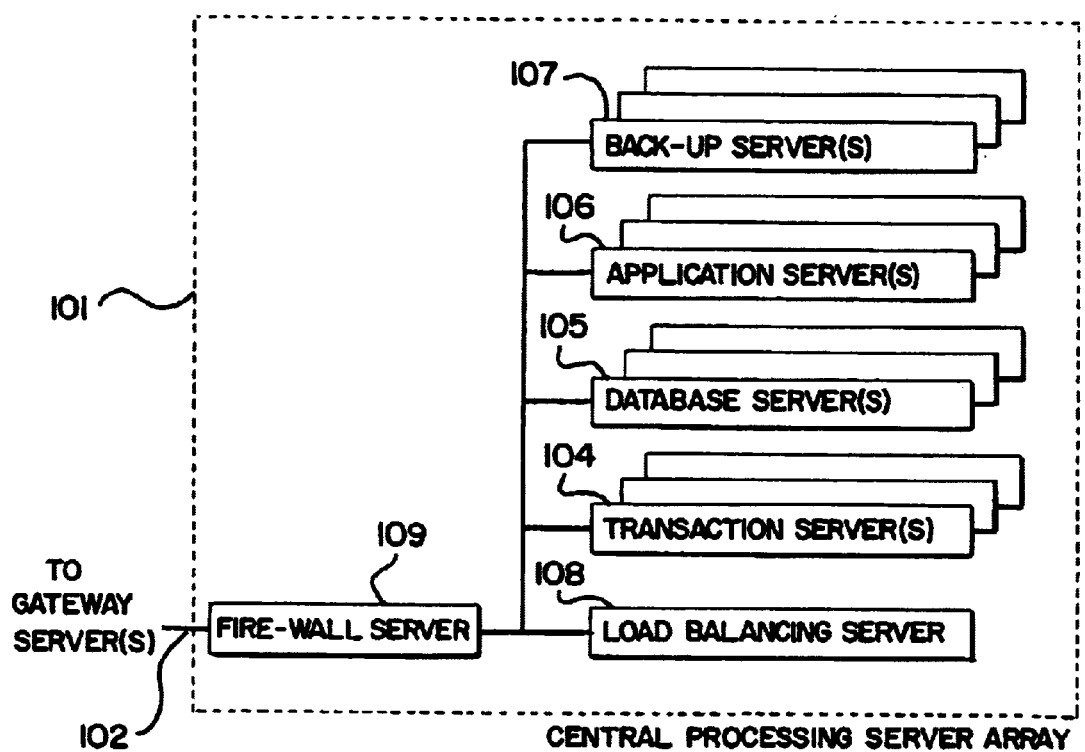
FIG. 8 is an exploded block diagram of the central processing server array shown in FIGS. 4, 5 and 7.

Central processing server array 101 is shown in greater detail in FIG. 8. Array 101 may typically consist of a plurality of servers, such as a plurality of transaction servers 104, a plurality of database servers 105, a plurality of application servers 106, a plurality of back-up servers 107 and a firewall server 109. Of course, the server array 101 can be implemented in a variety of other ways, such as with an Intel™-based computer, a Unix™-based computer, a mainframe computer or the like. Array 101 operates in general as a multi-purpose computer to receive, send, process and store information.

A plurality of server arrays 101 may be distributed in selected locations in a nationwide system, such as in Chicago, New York, Atlanta, Los Angeles, Denver and so forth. The APW terminals 20 will then generally communicate with the nearest server. Preferably, back-up servers are also provided to prevent the loss of stored information and to provide continued processing services in case any one server array becomes non-functional.

The server array 101 operates substantially as already described with reference to FIGS. 4 and 5. Array 101 periodically communicates with the employer's HR system 58 to obtain updated employee information. After calculating a payroll, the array 101 issues electronic fund transfers (EFTs) to transfer funds from the employer's commercial bank 61 to the appropriate federal, state and local taxing authorities 110 for the withheld taxes, FICA and other applicable taxes. The array 101 records all transactions and is able to track the history of all payments.

Server array 101 also issues EFTs upon calculating the payroll from the employer's account at employer's bank 61 through a worldwide ATM network gateway 115. An electronic file containing the amount of the net pay to be credited to each employee's account is sent to the appropriate ATM network processor, such as Plus™ 117, Cirrus™ 118, STAR™ 119 or others 120. Thus, each APW card account is incremented with that employee's net pay. The server array 101 then contacts the appropriate card issuing bank, such as bank 62, to confirm the success of the EFT transfers, as by comparing the total deposit with the sum of all the individual employee net payments. If the EFTs were successful, each employee should have his/her account credited by the appropriate amount of net pay.

ATM networks and processors, such as Cirrus™/Maestro™ 118 owned by MasterCard™, Plus™ 117 owned by VISA™ and Star™ 119 owned by Concord EFS™ are entities that own and link many ATM machines. These entities are in effect service providers for their respective ATM machines. These networks 117–120 have central processing systems that permit funds to be deposited to accounts such as those associated with each employee's APW card. Similarly, these processing systems of the networks 117–120 debit the cardholder's account if cash is withdrawn at an ATM 65 or a purchase is made at a POS 66, such as at a grocery store, gas station or the like. Typically, the POS 66 makes a modem connection with one of the networks and processors 117–120 to process an EFT in the amount of the purchase for credit to the appropriate merchant.

The payroll and work management system 100 also has a call center including a 1–800 support number 125, an automated voice response (AVR) system, one or more call center operators and a call center server array 128. Thus, an employee having difficulty with any APW terminal 20 may call the 1–800 number for help with a transaction, system status, payroll or balance inquiries or the like. Call center operators 127 may have a personal computer to access the central processing server arrays 101 via the call center server array 128 to obtain information about the inquiring employee's account by first logging into central processing server array 101. When using the AVR system 126 from a remote telephone, the inquiring employee uses the matrix of keys on the telephone to access the desired information by following the commands issued by the voice response system in a manner known to the art. The employee logs onto array 101 by entering the bank account number on the APW card and then entering the associated PIN.

It will be appreciated that any employee will have considerable reluctance to give even his/her best friend their APW card and PIN. This is because the friend will then be able to access that employee's bank account associated with the account number and with the PIN. Even if the friend does not fraudulently withdraw funds from the bank account, the friend will be able to view recent account activity at the APW terminal. Thus, the APW card and PIN operate very effectively to significantly reduce the buddy-punching problem. This may be nearly as effective as any known biometric system, and the APW system may be implemented at a fraction of the cost of biometric systems.

The APW system also significantly reduces the expenses associated with the conventional activities of processing time sheets and then issuing and distributing checks. Moreover, the APW system readily provides available payroll funds without the expenses attendant to cashing payroll checks at a currency exchange, and provides for more frequent payrolls, such as on a daily basis. It also provides an effective bank account for all employees. Employees may obtain a printed payroll stub at any APW terminal, complete with details on the gross pay, deductions and net pay. Work assignments may also be available for viewing and printing at any APW terminal.

While particular embodiments of the invention have been shown and described, it will be apparent to those skilled in the art that changes and modifications may be made therein without departing from the invention in its broader aspects, and, therefore, the aim of the appended claims is to cover all such changes and modifications as fall within the true spirit and scope of the invention.

What is claimed is:

1. An electronic payroll system for processing a payroll, comprising:

a computer with a memory for storing the names of a plurality of employees, the pay rate for each employee, a unique identifying bank account number for each employee, a personal identification number associated with each bank account number, and for storing the check-in and checkout times of each employee, a bankcard coded with one of the unique identifying bank account numbers assigned to each employee, a personal identification number assigned to each employee and associated with each unique identifying bank account number, an electronic terminal with a bankcard reader for reading the coded unique identifying bank account number on the bankcard, with a plurality of entry keys for entering the personal identification number and with means for communicating the unique identifying bank account number and the personal identification number to the computer, said computer in communication with said electronic terminal to receive the unique identifying bank account number and personal identification number, to compare said bank account number and personal identification number as received from said electronic terminal and said memory to determine if said bank account number and personal identification number correspond to a set of numbers stored in the computer memory for a particular employee, and, if so, to authenticate the bank account number and to use the current time as a payroll check-in or checkout status for that employee.

2. The electronic payroll system in accordance with claim 1 further comprising:

a printer disposed in said electronic terminal, a viewable display disposed on said terminal for displaying different selectable options including a view payroll option and a print payroll option, a set of operable keys disposed on said terminal for selecting one of the different selectable options on said display, whereby an employee may print a payroll stub at said terminal by selecting the print payroll option.

3. The electronic payroll system in accordance with claim 1 further comprising:

a viewable display disposed on said terminal for displaying different selectable options including a view new work assignments and/or instructions, a set of operable keys disposed on said terminal for selecting one of the different selectable options on said display, whereby an employee may view his/her new work assignments and/or instructions.

4. The electronic payroll system in accordance with claim 1 further comprising:

a printer disposed in said electronic terminal, said viewable display disposed on said terminal for also displaying a print work assignment and/or instructions option, whereby an employee may use said operable keys to select and print the work assignments and/or instructions at said terminal.

5. The electronic payroll system in accordance with claim 1 further comprising:

an infrared port disposed on said terminal for receiving work quality audits, and said electronic terminal communicating said received work quality audit to said computer.

6. The electronic payroll system for processing a payroll in accordance with claim 1 wherein said computer is in communication with said electronic terminal via the internet.

7. A method of processing a payroll in an electronic payroll system including a computer with memory for storing the names of a plurality of employees, the pay rate for each employee, a unique identifying bank account number assigned to each employee, a personal identification number associated with each bank account number and the check-in and checkout times of each employee, a bankcard coded with one of the unique identifying bank account numbers assigned to each employee, a personal identification number assigned to each employee and associated with each unique identifying bank account number, and an electronic terminal with a bankcard reader for reading the bank account number coded on the bankcard, with a plurality of entry keys for entering the personal identification number and with means to communicate with said computer, the method comprising the steps of:

communicating said bank account number from the electronic terminal to the computer, communicating the personal identification number from the electronic terminal to the computer, comparing the bank account number and personal identification number to sets of numbers stored in the memory of the computer for at least some of the employees, and using the current time as a payroll check-in or payroll checkout status for a particular employee if the bank account number and personal identification number correspond to a set of numbers stored in the computer memory for that employee.

8. The method in accordance with claim 7 including the additional step of:

periodically updating the employee information stored in the memory of the computer.

9. The method in accordance with claim 7 including the additional step of:

calculating the amount of time between payroll check-in and payroll checkout for each employee, calculating the amount of pay for each employee based upon the time between payroll check-in and payroll checkout and the pay rate for each employee, and transmitting the calculated amount of net pay for each employee to a bank that issued the bankcards.

10. The method in accordance with claim 9 including the additional step of:

crediting each unique identifying bank account number with the calculated net pay for those particular employees.

11. The method in accordance with claim 10 including the additional step of:

printing a copy of the previously calculated payroll associated with a unique bank account number at the electronic terminal after the computer has authenticated the bank account number and personal identification number of a particular employee.

12. An electronic payroll system for processing a payroll including a computer with memory for storing the names of a plurality of employees, the pay rate for each employee, a unique identifying bank account number assigned to each employee, a personal identification number associated with each bank account number and the check-in and checkout times of each employee, a bank card coded with one of the unique identifying bank account numbers assigned to each employee, a personal identification number assigned to each employee and associated with each unique bank identifying account number, including:

an electronic terminal with a bankcard reader for reading the coded unique account number on the bank card, a plurality of entry keys for entering the personal identification number and with means for communicating the unique bank account number and personal identification number from the electronic terminal to the computer, whereby said computer compares the received bank account number and the received personal identification number to sets of numbers stored in the memory of the computer, and uses the current time as an employee payroll check-in or payroll check-out status for a particular employee if the bank account number and personal identification numbers correspond to a set of numbers stored in the computer memory for that employee.

13. The electronic payroll system in accordance with claim 12 wherein said computer periodically determines the payroll for each employee and issues electronic fund transfers to credit a bank account associated with each employee's bankcard with that employee's net pay.

14. The electronic payroll system in accordance with claim 13, wherein the payroll is credited to each employee's bank account on a daily basis.

15. The electronic payroll system for processing a payroll in accordance with claim 12 wherein said computer is in communication with said electronic terminal via the internet.

16. An electronic terminal in an electronic payroll system for processing a payroll, the system including a computer with a memory for storing the names of a plurality of employees, the pay rate for each employee, a unique identifying bank account number for each employee, a personal identification number associated with each bank account number and the check-in and checkout times of each employee, a bankcard coded with one of the unique identifying bank account numbers assigned to each employee and a personal identification number assigned to each employee and associated with each unique identifying bank account number, said electronic terminal comprising:

a card reader for reading the coded unique identifying bank account number on the bankcard, a plurality of entry keys for entering the personal identification number assigned to each employee and associated with each unique identifying bank account number, a viewable display disposed on said electronic terminal for displaying a plurality of options including check-in to work and checkout of work, means for selecting one of said plurality of options displayed on said display including check-in to work or checkout of work, electronic communication means disposed in said electronic terminal to communicate said unique identifying bank account number, said personal identification number and said check-in to work or said checkout of work option to said computer.

17. The electronic terminal in accordance with claim 16 further comprising:

a printer disposed in said electronic terminal, said viewable display disposed on said terminal displays a view payroll option and a print payroll option, said means for selecting one of the different selectable options on said display including the view payroll option and the print payroll option, whereby an employee may print a payroll stub at said terminal by selecting the print payroll option.

18. The electronic terminal in accordance with claim 16 further comprising:

said viewable display disposed on said terminal displays a view new work assignment and/or instruction, said means for selecting one of the different selectable options on said display including the view new work assignment and/or instruction, whereby an employee may view his/her new work assignment and/or instruction.

19. The electronic terminal in accordance with claim 18 further comprising:

a printer disposed in said electronic terminal, said viewable display disposed on said terminal also displays a print work assignment and/or instruction option, whereby an employee may use said means for selecting one of the selectable options to print the work assignment and/or instruction at said terminal.

20. The electronic terminal in accordance with claim 16 further comprising:

an infrared port disposed on said terminal for receiving work quality audits, and said electronic terminal communicating said received work quality audit to said computer.

21. The electronic payroll terminal in an electronic payroll system in accordance with claim 16 wherein said electronic communication means includes the internet.

22. An electronic payroll system for processing a payroll, comprising:

a computer with a memory for storing the names of a plurality of employees, the pay rate for each employee and the check-in and checkout times of each employee, a bankcard coded with one of the unique identifying bank account numbers assigned to each employee, a personal identification number assigned to each employee and associated with each unique identifying account number, an electronic terminal with a bankcard reader for reading the coded unique identifying bank account number on the bankcard, with a plurality of entry keys for entering the personal identification number and with a data processor having memory for storing the unique identifying bank account numbers of the bankcard for at least some of the employees and the personal identification numbers for at least some of the employees, wherein said data processor is in communication with the reader to receive the unique identifying bank account number and is in communication with the plurality of entry keys to receive the personal identification number, said data processor comparing the received numbers with a set of unique identifying bank account numbers and personal identification numbers stored in said memory to determine if said received account number and received personal identification number correspond for a particular employee, and, if so, to authenticate the bank account number, and said terminal in communication with said computer to send the payroll check-in or checkout status for that employee to said computer.

23. The electronic payroll system in accordance with claim 22 further comprising:

a printer disposed in said electronic terminal, a viewable display disposed on said terminal for displaying different selectable options including a view payroll option and a print payroll option, a set of operable keys disposed on said terminal for selecting one of the different selectable options on said display, whereby an employee may print a payroll stub at said terminal by selecting the print payroll option.

24. The electronic payroll system in accordance with claim 22 further comprising:

a viewable display disposed on said terminal for displaying different selectable options including a view new work assignment and/or instruction, a set of operable keys disposed on said terminal for selecting one of the different selectable options on said display, whereby an employee may view his/her new work assignment and/or instruction.

25. The electronic payroll system in accordance with claim 22 further comprising:

a printer disposed in said electronic terminal, said viewable display disposed on said terminal for also displaying a print work assignment and/or instructions option, whereby an employee may use said operable keys to select and print the work assignments and/or instructions at said terminal.

26. The electronic payroll system in accordance with claim 22 further comprising:

an infrared port disposed on said terminal for receiving work quality audits, and said electronic terminal communicating said received work quality audit to said computer.

27. The electronic payroll system for processing a payroll in accordance with claim 22 wherein said data processor is in communication with said computer via the internet.

28. A method of processing a payroll in an electronic payroll system including a computer with memory for storing the names of a plurality of employees, the pay rate for each employee and the check-in and checkout times of each employee, a bankcard coded with one of the unique identifying bank account numbers assigned to each employee, a personal identification number assigned to each employee and associated with each unique identifying bank account number, and an electronic terminal with a bankcard reader for reading the unique identifying bank account number coded on the bankcard, with a plurality of entry keys for entering the personal identification number and with a data processor having memory for storing the unique identifying bank account numbers of the bankcard for at least some of the employees and the personal identification numbers for at least some of the employees, the method of:

receiving said bank account number from the bankcard reader at the data processor, receiving the personal identification number from the plurality of entry keys at the data processor, comparing the received bank account number and the received personal identification number to bank account numbers and personal identification numbers stored in the memory of the data processor, and using the current time as a payroll check-in or payroll checkout status for a particular employee if the bank account number and personal identification numbers correspond to a set of numbers stored in the memory of the data processor for that employee.

29. The method in accordance with claim 28 including the additional step of:

communicating the check-in or checkout status for that employee from said terminal to said computer.

30. The method in accordance with claim 29 including the additional step of:

periodically updating the employee information stored in the memory of the microprocessor and in said computer.

31. The method in accordance with claim 29 including the additional step of:

calculating the amount of time between payroll check-in and payroll checkout for each employee, calculating the amount of pay for each employee based upon the time between payroll check-in and payroll checkout and the pay rate for each employee, and transmitting the calculated amount of net pay for each employee to a bank that issued the bank cards.

32. The method in accordance with claim 31 including the additional step of:

crediting each unique identifying bank account number with the calculated net pay for those particular employees.

33. The method in accordance with claim 32 including the additional step of:

printing a copy of the previously calculated payroll associated with a unique bank account number at the electronic terminal after the data processor has authenticated the bank account number and personal identification number of a particular employee.

34. An electronic payroll system for processing a payroll including a computer with memory for storing the names of a plurality of employees, the pay rate for each employee and the check-in and checkout times of each employee, a bank card coded with one of the unique identifying bank account numbers assigned to each employee, a personal identification number assigned to each employee and associated with each unique identifying bank account number, including:

an electronic terminal with a bank card reader for reading the coded unique bank account number on the bank card, with a plurality of entry keys for entering the personal identification number and with a data processor with memory having memory for storing the unique identifying bank account numbers of the bankcards for at least some of the employees and the personal identification numbers for at least some of the employees, whereby said data processor compares the received account number and the received personal identification number to sets of numbers stored in the memory of the data processor and uses the current time as an employee payroll check-in or payroll check-out time for a particular employee if the bank account number and personal identification numbers correspond to a set of numbers stored in the data processor memory for that employee, and said terminal communicates the check-in or checkout status for the particular employee to the computer.

35. The electronic payroll system in accordance with claim 34 wherein said computer periodically determines the payroll for each employee and issues electronic fund transfers to credit a bank account associated with each employee's bankcard with that employee's net pay.

36. The electronic payroll system in accordance with claim 35 wherein the payroll is credited to each employee's bank account on a daily basis.

37. The electronic payroll system for processing a payroll in accordance with claim 34 wherein said data processor is in communication with said computer via the internet.

38. An electronic terminal in an electronic payroll system for processing a payroll, the system including a computer with a memory for storing the names of a plurality of employees, the pay rate for each employee and the check-in and checkout times of each employee, a bankcard coded with one of the unique identifying bank account numbers assigned to each employee and a personal identification number assigned to each employee and associated with each unique identifying bank account number, said electronic terminal comprising:

a bankcard reader for reading the coded unique identifying bank account number on the bankcard, a plurality of entry keys for entering the personal identification number assigned to each employee and associated with each unique identifying bank account number, a viewable display disposed on said electronic terminal for displaying a plurality of options including check-in to work and checkout of work, means for selecting one of said plurality of options displayed on said display including check-in to work and checkout of work, a data processor with memory having memory for storing the unique identifying bank account numbers of the bankcards for at least some of the employees and the personal identification numbers for at least some of the employees, said data processor compares the received bank account number and the received personal identification number to sets of numbers stored in the memory of the data processor and uses the current time as an employee payroll check-in or payroll check-out status for a particular employee if the bank account number and personal identification numbers correspond to a set of numbers stored in the data processor memory for that employee, and said data processor communicates the check-in to work or the checkout of work status to said computer.

39. The electronic terminal in accordance with claim 38 further comprising:

a printer disposed in said electronic terminal, said viewable display disposed on said terminal displays a payroll option and a print payroll option, said means for selecting one of the different selectable options on said display includes the view payroll option and the print payroll option, whereby an employee may print a payroll stub at said terminal by selecting the print payroll option.

40. The electronic terminal in accordance with claim 33 further comprising:

said viewable display disposed on said terminal displays a new work assignment and/or instruction, said means for selecting one of the different selectable options on said display includes the view new work assignment and/or instruction, whereby an employee may view his/her new work assignment and/or instruction.

41. The electronic terminal in accordance with claim 40 further comprising:

a printer disposed in said electronic terminal, said viewable display disposed on said terminal also displays a print work assignment and/or instruction option, whereby an employee may use said means for selecting one of the selectable options to print the work assignment and/or instruction at said terminal.

42. The electronic terminal in accordance with claim 38 further comprising:

an infrared port disposed on said terminal for receiving work quality audits, and said electronic terminal communicating said received work quality audit to said computer.

43. The electronic payroll terminal in an electronic payroll system in accordance with claim 38 wherein said data processor is in communication with said computer via the internet.

* * * * *